United States Patent Office 3,485,842
Patented Dec. 23, 1969

3,485,842
HETEROCYCLIC COMPOUNDS AND MEANS FOR PRODUCING THE SAME
John Davoll, 10 Broadlands Ave., Shepperton, England
No Drawing. Continuation-in-part of application Ser. No. 393,741, Sept. 1, 1964. This application June 14, 1966, Ser. No. 557,353
Claims priority, application Great Britain, Sept. 20, 1963 (provisional), Sept. 17, 1964 (complete), 37,193
Int. Cl. C07d 51/42
U.S. Cl. 260—256.4                 4 Claims

ABSTRACT OF THE DISCLOSURE 2,4-diaminoquinazolines (I) and their acid salts

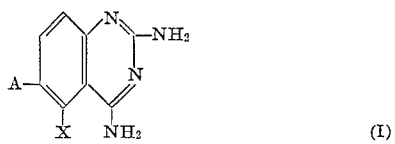

are prepared: by reducing a 2,4-diamino-6-nitroquinazoline to the corresponding 2,4,6-triaminoquanazoline; by reacting an aldehyde Ar—CHO or ketal Ar—C(alkyl)=(O-alkyl)$_2$ with a 2,4,6-triaminoquinazoline to obtain the imine of Formula I where A is Ar—C(R$_1$)=N— and reducing the imine; and by N-alkylating a 2,4-diaminoquinazoline of Formula I where A is Ar—C(R$_1$)—NH—; where A represents NH$_2$—, Ar—C(R$_1$)=N— or

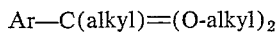

X is hydrogen, chlorine or methyl; R$_1$ and R$_7$ can be hydrogen or alkyl; and Ar is phenyl, substituted phenyl, naphthyl, substituted naphthyl or a heterocyclic group. The compounds are pharmacological agents having one or more properties such as antiviral, anthelmintic, antiparasitic, antibacterial and diuretic properties.

Summary and detailed description

This application is a continuation-in-part of my copending application Ser. No. 393,741 filed Sept. 1, 1964, now abandoned.

This invention relates to novel chemical compounds and to means of producing the same. More particularly, the invention relates to 2,4-diaminoquinazolines having in free base form the formula:

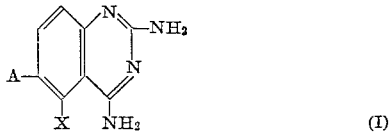

and acid addition salts thereof, where A represents the group NH$_2$—, Ar—CH=N—; or

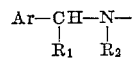

X is a hydrogen or chlorine atom or a methyl group; R$_1$ and R$_2$ represent hydrogen or lower alkyl (especially C$_{1-4}$ alkyl); and Ar signifies a phenyl group; a substituted phenyl group such as a mono-, di- or tri-(lower alkyl) phenyl, mono- or di-(halo)phenyl, hydroxyphenyl, mono- di- or tri-(lower alkoxy)phenyl, carboxyphenyl, carb-(lower alkoxy)phenyl, nitrophenyl, aminophenyl, mono- or di-(lower alkyl)aminophenyl, or acetaminophenyl group; a naphthyl group; a substituted naphthyl group such as a halonaphthyl, hydroxynaphthyl, nitronaphthyl, amino- naphthyl or lower alkoxynaphthyl group; or a heterocyclic group such as a furyl, thienyl or pyridyl group.

In accordance with the invention, novel 2,4,6-triaminoquinazolines (Formula I above where A is an amino group and X has the above-specified significance) are prepared by subjecting the corresponding 2,4-diamino-6-nitroquinazoline free base or acid addition salt to reduction. The reduction can be carried out in several different ways. For example, it can be carried out with stannous salts in mineral or organic acid (such as acetic or hydrochloric acid) followed by base decomposition of the resulting complex; with hydrogen gas and a metal hydrogenation catalyst; or with similar reducing means. A preferred reagent is stannous chloride in hydrochloric acid. The reaction conditions are subject to considerable variation. In the case of stannous chloride, at least three moles and preferably a slight excess are used for each mole of nitroquinazoline, but larger excesses can be employed if desired. The reaction proceeds at ordinary temperature, preferably in the range from about 0 to 30° C., and is ordinarily complete in a short period, i.e., about 1 to 10 hours. Following reaction, the mixture is decomposed by addition of base such as aqueous sodium hydroxide and the product is isolated as the free base or after acidification as the acid addition salt.

For the hydrogenation by catalytic means, a variety of conditions and catalysts can be used. Hydrogen pressures ranging from atmospheric to about 100 atmospheres are suitable, although relatively low pressures of the order of about 5 atmospheres are preferred. Moderate temperatures, i.e., temperatures in the range of about 25 to 100° C., are ordinarily employed. While palladium is a preferred catalyst for the hydrogenation. Raney nickel and noble metal catalysts such as platinum, palladium oxide and platinum oxide can also be used. The hydrogenation is carried out in an inert organic solvent such as dimethylformamide or ethanol.

According to a further embodiment of the invention, substituted amino compounds of formula:

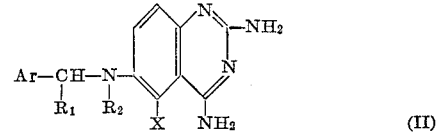

where R$_2$ is hydrogen, are produced by reacting an aldehyde of formula Ar—CHO or a lower dialkyl ketal of formula Ar—C(lower alkyl)=(O-lower alkyl)$_2$ with an equivalent quantity of a 2,4,6-triaminoquinazoline of Formula I where A is NH$_2$— in an inert organic solvent, and subjecting the resulting imine compound of formula:

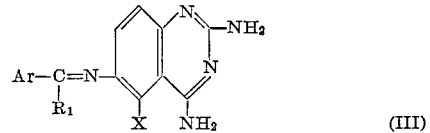

to reduction; where X, R$_1$ and Ar have the above-specified significance. The reaction with the carbonyl compound can be run under a variety of conditions. Various organic solvents or mixtures thereof can be used, e.g., lower alkanols, hydrocarbons, cyclic ethers such as tetrahydrofuran, and dioxane, 2-ethoxyethanol, dimethylformamide and aliphatic ethers. The reaction is usually run at reflux temperature in the range from about 35 to 150° C. and preferably from about 60 to 120° C. At these temperatures the reaction is ordinarily complete in one-half to ten hours or in about one to four hours at the preferred temperature range. For purposes of the invention the imine product obtained (Formula III) need not be isolated and can be used directly for the reduction. The reduction can be carried out in various ways, for example, by means of hydrogen gas and a metal hydrogenation catalyst, by reaction with an alkali metal borohydride or by other similar means. The hydrogenation is carried out in a solvent such as ethanol, dimethylformamide, tetrahydrofuran, acetic acid, toluene, benzene or mixtures thereof, or in a water-miscible solvent such as ethanol or 2-ethoxyethanol optionally in admixture with water. As hydrogenation catalysts, one may use Raney nickel, Raney cobalt or the like, or a noble metal catalyst such as palladium, platinum, oxides thereof and similar catalysts. With a nickel or cobalt catalyst, hydrogen pressure of about 30 to 100, and preferably 50 to 70, atmospheres are used; and the reduction is suitably carried out at temperatures in the range of about 50 to 120° C., a range of 80 to 110° C. being preferred. With a noble metal catalyst, a hydrogen pressure of about one to three atmospheres is used, the reduction being carried out at room temperature or, if desired, at higher temperature up to about 60° C. Reduction with an alkali metal hydride (e.g., sodium borohydride) is carried out in an organic solvent such as a lower alkanol, ether, tetrahydrofuran and the like, at temperatures in the range from about −20 to 20° C. and preferably in the range from 0 to 10° C., using at least one mole of the hydride for each mole of imine compound. The method is for reduction of compounds having substituents which are to be maintained intact such as a nitro substituent.

According to a still further embodiment of the invention the substituted amino compounds of Formula II where $R_2$ is lower alkyl are produced by reacting the corresponding substituted amino compounds of the same formula where $R_2$ is hydrogen, with an N-alkylating agent such as an alkyl halide, sulfate or sulfonate. The reaction is preferably carried out in an inert organic solvent such as ethanol or dimethylformamide. The relative proportions of reactants can be varied widely but it is preferred to use a slight excess of the alkylating agent. The reaction temperature is not critical but temperatures in the range from 40 to 150° C. are preferred.

The free base compounds of the invention form acid addition salts upon reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, gluconate, ascorbate, benzene-sulfonate and sulfamate, as well as salts with fluorescein and dibasic acids such as methylenebis(hydroxynaphthoic acid). The acid addition salts are conveniently formed by mixing the free base with at least an equivalent amount of the acid of the acid in a solvent in which the salt is insoluble, particularly after chilling, thereby permitting recovery of the desired salt as a solid phase. The invention contemplates the acid salts broadly. Those salts which are unsuited to particular uses as for example uses where toxicity is a problem, are nevertheless useful as intermediates, being readily convertible to non-toxic acid salts by means which per se are known to those in the art. Whereas both the free base and salt forms of the products are useful for the purposes of the invention, the salts of the triamine and substituted amino products (where A of Formula I is $NH_2$— and

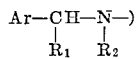

are generally preferred in those cases where increased stability and water solubility are desired.

The products of the invention possess significant pharmacological properties as shown in standard tests. In particular, the 5-substituted 2,4,6-triaminoquinazolines (Formula I where A is $NH_2$— and X is chloro or methyl) possess antibacterial activity. 5-chloro-2,4,6-triaminoquinazoline and its salts, for instance, are active in vitro against tuberculosis, Streptococcus, Proteus, Pseudomonas and Salmonella organisms, being active also against bacterial infection in the mouse. Significantly, the latter products possess a synergistic action with sulfonamide antibacterial agents against infection caused by gram-negative organisms. 2,4,6-triaminoquinazoline (Formula I where A is $NH_2$— and X is hydrogen) possesses both antiviral activity and diuretic activity. The imine compounds of Formula III have antiviral, diuretic and/or antibacterial activity. The substituted amino compounds of Formula II in general exhibit antiparasitic, anthelmintic, anitiviral, antibacterial, and diuretic activity. More particularly, the substituted amino compounds in general posses a unique mode of action against certain malarial parasites which are resistant to pyrimethamine, chloroguanide, acridines and the like. Also, some of the latter compounds show activity against Chagas disease (Trypanosoma cruzi infection) and are effective against pinworms and the causative agents of amebiasis (E. histolytica) and trichomoniasis (T. vaginalis). Accordingly, as the free base or acid addition salt in appropriate pharmaceutical dosage form, the 2,4,6-triaminoquinazoline compounds of the invention have application as antibacterial agents or antiviral or diuretic agents. The imine compounds of Formula III are applicable as antiviral, diuretic and/or antibacterial agents and the substituted amino compounds of Formula II as antiparasitic, anthelmintic, antiviral, antibacterial and/or diuretic agents. The products are also useful as intermediates for the production of other organic compounds.

It will be appreciated that for clniical use the pharmacologically active compounds of the invention can be made up, in accordance with well known pharmaceutical techniques, into compositions having as an essential active ingredient a 2,4,6-triaminoquinazoline compound of the Formula I above or an acid addition salt thereof. The compositions will generally contain in association with the active ingredient one or more pharmaceutical diluents and/or excipients of the kind normally used in the production of medicaments ready for use. If desired, the compositions can be made up in a dosage unit form suitable for the particular mode of administration, the quantity of active ingredient in each dosage unit being such that one or more units are required for each therapeutic administration. The dosage unit may exist, for example, in the form of a tablet, pill, sachet, packaged powder or encapsulated powder for oral administration or in the form of a sterile injectable solution or suspension contained in an ampoule for parenteral administration.

The invention is illustrated by the following examples.

Example 1

(a) 2,4-diamino-6-nitroquinazoline (52.5 g.) is added with cooling and stirring to a solution of stannous chloride dihydrate (190 g.) in one liter of concentrated hydrochloric acid while maintaining the temperature below 30° C. The reaction mixture is stirred for one hour at 20° C. and then for two hours at 0° C. whereupon the solid product (stannichloride complex) which has separated is collected, washed successively with concentrated hydrochloric acid and ether, dried and dissolved in hot water (300 ml.). A solution of sodium hydroxide (75 g.) in water (150 ml.) is added to the hot solution, and upon cooling, the desired product, 2,4,6-triaminoquinazoline, which separates, is collected; M.P. after decolorization with charcoal and recrystallization from water 255–257° C. The hydrochloride, hydrobromide, sulfate, sulfamate and p-toluenesulfonate salts can be prepared from the free base by treating an ether solution of the free base with one equivalent of the corresponding acid.

(b) 2,4-diamino-6-nitroquinazoline (1.03 parts by weight) as a suspension in dimethylformamide (25 parts by volume) is hydrogenated at ordinary temperature and pressure using 10% palladised charcoal. After absorption of the theoretical amount of hydrogen (30 minutes), the reaction mixture is filtered and the filtrate concentrated to a low volume by removal of solvent. The residual product, 2,4,6-triaminoquinazoline, is purified by crystallization from water; M.P. 255–258° C. The product can also be obtained in good yield by the same procedure but using higher temperature (100° C.) and pressure (55 atmospheres) for the hydrogenation.

The starting material for (a) and (b) above, 2,4-diamino-6-nitroquinazoline, can be prepared by nitration of 2,4-diaminoquinazoline, according to the following description: a solution of 2,4-diaminoquinazoline (30 g.) in water (900 ml.) is treated at 95° c. with concentrated nitric acid (60 ml.). After cooling, the resulting nitrate salt is collected, washed with water, and dried. The nitrate salt (37.2 g.) is added in small portions with stirring to a mixture of fuming nitric acid (186 ml., density 1.5) and concentrated sulphuric acid (186 ml.) while maintaining the temperature below 10° C. The mixture is stirred for 15 minutes in the cold and is then allowed to warm up to 20° C. over a one-hour period. The resulting clear solution is added to ice (2 kg.) and the mixture is adjusted to pH 7–8 by addition of concentrated aqueous ammonia while maintaining the mixture at low temperature by addition of ice as necessary. The solid product, 2,4-diamino-6-nitroquinazoline, is collected and washed with water. The acetate salt is obtained by recrystallization of the product from glacial acetic acid; M.P. greater, than 350° C.

Example 2

(a) The starting material 2,4-diamino-5-chloro-6-nitroquinazoline (22.1 g.) is added below 30° C. to a stirred solution of 65 g. of stannous chloride dihydrate in 350 ml. of concentrated hydrochloric acid and 92 ml. of acetic acid and the mixture is stirred 18 hours at 20° C. The resulting precipitate is collected by filtration, washed with minimum amounts of concentrated hydrochloric acid and water, and then suspended in ice water. The mixture is basified with 40% aqueous sodium hydroxide while adding ice to maintain the temperature below 40° C. The solid free base product, 2,4,6-triamino-5-chloroquinazoline monohydrate, is collected, washed with water and dried; M.P. 200–203° C. after recrystallization from water following charcoal treatment. The hydrochloride, hydrobromide, sulfate, sulfamate and p-toluenesulfonate salts are prepared from the free base by treating an ether solution of the free base with one equivalent of the corresponding acid.

(b) The starting material for (a) above can be prepared from known materials by the following procedure: A mixture of 37 g. of 6-chloroanthranilonitrile and 34.3 g. of cyanamide dihydrochloride in 240 ml. of diethylene glycol dimethyl ether is stirred and heated at 145–150° C. for 2.5 hours. The mixture is cooled, diluted with 700 ml. of ether and the precipitated crude product, 2,4-diamino-5-chloroquinazoline hydrochloride, is collected and powdered. The crude product is stirred with 2.5 liters of boiling water; the mixture is basified with aqueous ammonia, treated with charcoal and filtered. The hot filtrate is chilled and the crystalline product, 2,4-diamino-5-chloroquinazoline, removed by filtration. After recrystallization from water the product melts at 183–185° C. To a stirred mixture of 270 ml. of fuming nitric acid (d.=1.5) and 270 ml. of concentrated sulfuric acid is added portionwise over a 2.5 hour period, 50 g. of 2,4-diamino-5-chloroquinazoline, while keeping the temperature below 20° C. The resulting solution is allowed to stand for 18 hours, then poured onto 3 kg. of crushed ice. The mixture is basified with aqueous ammonia (d.=0.880) while adding ice to maintain the temperature below 40° C. The product which separates, 2,4-diamino-5-chloro-6-nitroquinazoline, is collected, washed with water and dried.

Example 3

(a) A mixture of 2,4-diamino-5-methyl-6-nitroquinazoline, acetate salt (9.0 g.), 500 ml. of ethanol and 1.0 g. of 10% palladium on charcoal is shaken with hydrogen at atmospheric pressure and 45° C. until hydrogen uptake ceases. The mixture is filtered and the filtrate concentrated to a volume of 50 ml. and chilled to crystallize the free base product, 2,4,6-triamino-5-methylquinazoline; M.P. 220–222° C. The hydrochloride, hydrobromide, sulfate, sulfamate and p-toluenesulfonate salts are prepared from the free base by treating an ether solution of the free base with one equivalent of the corresponding acid.

(b) The starting material for (a) above can be prepared by the following illustrative procedure: 6-chloro-o-tolunitrile (60 g.) is added in portions with stirring in the cold (−15 to −10° C.) to fuming nitric acid (300 ml.; density, 1.5). The mixture is allowed to stand for 24 hours at room temperature, and is then added, with stirring, to 4.5 liters of ice water. The solid which separates, 6-chloro-3-nitro-o-tolunitrile, is collected and recrystallized from aqueous ethanol; M.P. 75–80° C. A mixture of 20 g. of the latter product, 38 g. of guanidine carbonate and 1.0 liter of 2-ethoxyethanol is heated at reflux for 3.5 hours. The solution is evaporated at reduced pressure and the residue triturated with 200 ml. of water. The crude 2,4-diamino-5-methyl-6-nitroquinazoline is collected by filtration and dissolved in 200 ml. of hot 80% aqueous acetic acid. The solution is filtered, diluted with 30 ml. of 6 N aqueous ammonia and chilled to crystallize the acetate salt of 2,4-diamino-5-methyl-6-nitroquinazoline; M.P. 288° C. with decomposition.

Example 4

2,4,6-triaminoquinazoline (3.5 g.) and benzaldehyde (2.12 g.) are refluxed together in ethanol (40 ml.) for two hours. The reaction mixture is cooled and the resulting product, 2,4-diamino - 6 - benzylideneaminoquinazoline, collected and recrystallized from ethanol; M.P. 222° C.

By the same procedure, other similar condensation products can be prepared starting with proportionate quantities of 2,4,6-triaminoquinazoline and the respective aldehyde, as follows:

| Aldehyde | 2,4-diamino quinazoline product | M.P., ° C. |
| --- | --- | --- |
| p-Tolualdehyde | 6-(p-Methylbenzylideneamino) | 273 |
| o-Tolualdehyde | 6-(o-Methylbenzylideneamino) | 224–227 |
| 2-naphthaldehyde | 6-[(2-naphthylmethylene)-amino] | 244–247 |
| Furfuraldehyde | 6-[(2-furfurylidene)amino] | 238–240(dec.) |
| 2-pyridinecarboxaldehyde | 6-[(2-pyridylmethylene)-amino] | 239 |
| 4-pyridinecarboxaldehyde | 6-[(4-pyridylmethylene)-amino] | 317–319 |

Similarly, the same procedure in which benzaldehyde is replaced with an equivalent amount of salicylaldehyde, or m- or p-hydroxybenzaldehyde provides as a product the respective α - [(2,4 - diamino - 6 - quinazolinyl)imino]-o-, m- or p-cresol.

Example 5

2,4,6 - triaminoquinazoline (11.8 g.), 2,4,6-trimethylbenzaldehyde (10 g.), dimethylformamide (150 ml.) and benzene (150 ml.) are refluxed together under a water separator for 6 hours. After cooling, the reaction mixture is filtered and the filtrate evaporated to a small volume (about 25 ml.). The residual product, 2,4 - diamino-6-(2,4,6 - trimethylbenzylideneamino)quinazoline, can be purified by recrystallization from aqueous (50%) ethanol; M.P. 264° C.

Using the same procedure, other similar products can be prepared starting with proportionate quantities of 2,4,6-triaminoquinazoline and the respective aldehyde, as follows:

| Aldehyde | 2,4-diamino quinazoline product | M.P., ° C. |
|---|---|---|
| p-Fluorobenzaldehyde | 6-(p-fluorobenzylideneamino) | 257–259 |
| o-Chlorobenzaldehyde | 6-(o-chlorobenzylideneamino) | 260–261 |
| m-Chlorobenzaldehyde | 6-(m-chlorobenzylideneamino) | 239–240 |
| 2,4-dichlorobenzaldehyde | 6-(2,4-dichlorobenzylideneamino) | 259–261 |
| 3,4-dichlorobenzaldehyde | 6-(3,4-dichlorobenzylideneamino) | 258 |

Example 6

2,4,6-triaminoquinazoline (3.5 g.) and p-chloro-benzaldehyde (2.81 g.) are refluxed together in 2 - ethoxyethanol (40 ml.) for 2 hours. The mixture is cooled and water (20 ml.) is added, whereupon the product, 2,4-diamino - 6 - (p-chlorobenzylideneamino)quinazoline, separates, and is collected; M.P. 280–282° C., after recrystallization from 75% ethanol. If m-methoxybenzaldehyde is substituted for p-chlorobenzaldehyde in this procedure, the resulting product is 2,4 - diamino-6-(m-methoxybenzylideneamino)quinazoline, M.P. 223–225° C. Likewise, where p-dimethylaminobenzaldehyde (2.98 g.) is substituted for p-chlorobenzaldehyde in this procedure, the product on cooling and addition of ethanol is 2,4 - diamino - 6 - (p - dimethylaminobenzylideneamino)quinazoline; M.P. 288–290° C.; similarly, where one substitutes p-methylaminobenzaldehyde for p-chlorobenzaldehyde, the product is 2,4-diamino-6-(p-methylaminobenzylideneamino)quinazoline.

Example 7

A solution of 2,4,6 - triaminoquinazoline (7 g.) and anisaldehyde (5.45 g.) in hot dimethylformamide (70 ml.) is treated with benzene (70 ml.) at 80° C. The mixture is heated under a water separator for 2 hours and is then concentrated to a volume of 80 ml. by evaporation of the solvent. The residual product obtained as a solid, 2,4 - diamino - 6 - (p-methoxybenzylideneamino)quinazoline, melts at 240–241° C. When anisaldehyde is substituted in this procedure by p-ethoxybenzaldehyde, 3,4,5-trimethoxybenzaldehyde or 4 - acetaminobenzaldehyde, the respective products obtained are 2,4-diamino-6-(p-ethoxybenzylideneamino)quinazoline, 2,4 - diamino-6 - (3,4,5 - trimethoxybenzylideneamino)quinazoline, or 2[(2,4 - diamino - 6 - quinazolinyl)imino]-p-acetotoluidine.

Example 8

2,4,6 - triaminoquinazoline (5.25 g.) and p-carbethoxybenzaldehyde (5.34 g.) in ethanol (40 ml.) are heated under reflux for 2 hours. After cooling the reaction mixture, the desired product, α[(2,4-diamino-6-quinazolinyl)-imino]-p-toluic acid, ethyl ester, is collected in solid form and recrystallized from aqueous 2-ethoxyethanol; M.P. 248–249° C. The free acid is obtained by refluxing the product (4.13 g.) with 2 N sodium hydroxide (65 ml.) for one-half hour and acidifying the resulting solution with acetic acid to pH 6. The free acid product, α-[(2,4-diamino-6-quinazolinyl)imino]-p-toluic acid, is collected and purified by dissolution in dilute alkali and reprecipitation with acetic acid.

Example 9

2,4,6-triaminoquinazoline (3.5 g.) and o-nitrobenzaldehyde (3.02 g.) in acetic acid (60 ml.) are refluxed together for 2 hours. After cooling, the solid product which separates, 2,4-diamino - 6 - (o-nitrobenzylideneamino) quinazoline acetate, is collected and recrystallized from water as the hemihydrate; M.P. 220–222° C. (dec.).

Example 10

(a) A solution of 15.1 g. of 2,4,6-triaminoquinazoline and 12.0 g. of acetophenone in 200 ml. of 2-ethoxyethanol is heated at reflux for 2 hours. The solution is cooled, 200 ml. of ethanol is added and the mixture is hydrogenated for 2 hours at a temperature of 100–110° C. and hydrogen pressure of about 50 atmospheres using Raney nickel catalyst. The mixture is cooled, filtered to remove catalyst, and evaporated at reduced pressure to give the product, 2,4-diamino-6-[(α-methylbenzyl) - amino]quinazoline; M.P. (hemihydrate), 200–202° C. after crystallization from aqueous ethanol. The monohydrochloride salt is prepared from the free base and one equivalent of hydrochloric acid in aqueous ethanol followed by concentration and cooling.

By the same procedure, other related free base and acid salt products can be prepared starting with proportionate quantities of 2,4,6-triaminoquinazoline and the respective ketone Ar—(R₁)—C=O, as follows:

| Ketone | 2,4-diaminoquinazoline product |
|---|---|
| Phenyl butyl ketone | 6-[(α-butylbenzyl)amino]. |
| m-Chlorophenyl ethyl ketone | 6-[(m-chloro-α-ethylbenzyl)amino]. |
| 3,4-Dimethoxyphenyl methyl ketone | 6-[(3,4-dimethoxy-α-methylbenzyl)-amino]. |
| p-Hydroxyacetophenone | 6-[p-hydroxy-α-methylbenzyl)amino]. |

Example 11

A solution of 16.5 g. of 2,4,6 - triamino-5-methylquinazoline and 17.5 g. of 3,4 - dichlorobenzaldehyde in 200 ml. of ethanol is heated at reflux for 2 hours. The mixture is then hydrogenated at 45–50° C. at a hydrogen pressure of 1 atmosphere using 10% palladised charcoal catalyst. The mixture is cooled, filtered to remove catalyst, and evaporated at reduced pressure to give the free base product, 2,4 - diamino - 6 - [(3,4 - dichlorobenzyl)amino]-5-methylquinazoline. The free base is dissolved in ethanol and the solution treated with one equivalent of hydrochloric acid. On dilution with water and cooling, the monohydrochloride salt monohydrate is obtained; M.P. 287–290° C.

By the same procedure, other related free bases and acid addition salts can be prepared starting with proportionate amounts of the quinazoline and the respective carbonyl compound (aldehyde or ketone), as follows:

the product which separates; 2,4-diamino-6-benzylaminoquinazoline salt with one-half formula weight of pamoic acid which crystallizes with one mole of water and one-half mole of ethanol; M.P. 189–190° C.

| Carbonyl compound | 2,4-diamino-5-methylquinazoline product |
|---|---|
| 2,4,6-trimethylbutyrophenone | 6-[(α-propyl-2,4,6-trimethylbenzyl)-amino]. |
| Benzaldehyde | 6-(benzylamino); M.P., 191–195° C. |
| 2-naphthaldehyde | 6-(2-naphthylmethylamino). |
| 2,4-dichlorobenzaldehyde | 6-[(2,4-dichlorobenzyl)amino]. |
| o-Chlorobenzaldehyde | 6-[(o-chlorobenzyl)amino]. |
| m-Carbethoxybenzaldehyde | 6-[(m-carbethoxybenzyl)amino]. |
| o-Carboxybenzaldehyde | 6-[(o-carboxybenzyl)amino]. |
| Anisaldehyde | 6-[(p-methoxybenzyl)amino]. |
| 2-pyridinecarboxaldehyde | 6-[(2-pyridylmethyl)amino]. |
| p-Dimethylaminobenzaldehyde | 6-[(p-dimethylaminobenzyl)amino]. |
| Furfural | 6-[(2-furfurylmethyl)amino]. |
| p-Acetaminobenzaldehyde | 6-[(p-acetaminobenzylmethyl)amino]. |
| 2-hydroxy-1-naphthaldehyde | 6-[(2-hydroxy-1-naphthylmethyl)amino]. |
| 2-amino-1-naphthaldehyde | 6-[(2-amino-1-naphthylmethyl)amino]. |
| 2-methoxy-1-naphthaldehyde | 6-[(2-methoxy-1-naphthylmethyl)amino]. |

Example 12

(a) A solution of 2,4-diamino-6-benzylideneaminoquinazoline is prepared by refluxing together 2,4,6-triamino-quinazoline (3.5 parts by weight), benzaldehyde (2.12 parts by weight) in 2-ethoxyethanol (40 parts by volume), for one hour. Ethanol (40 parts by volume) is added to the cooled solution, and the mixture is hydrogenated for 2 hours at a temperature from 100–110° C. and at a hydrogen pressure of about 50 atmospheres using Raney nickel catalyst. The mixture is cooled, filtered and concentrated by evaporation to 12.5 parts by volume. Water and ethanol (25 and 6.25 parts by volume) are added, and the mixture allowed to stand in the cold. The desired product which separates, 2,4-diamino-6-benzylaminoquinazoline, is collected and crystallized from 40% ethanol; M.P. 218–220° C.

In the same way, other benzylamino compounds can be prepared starting with the triaminoquinazoline and corresponding aldehydes, as follows:

| Aldehyde | 2,4-diamino quinazoline product | M.P., ° C. |
|---|---|---|
| o-Chlorobenzaldehyde | 6-(o-Chlorobenzylamino) | 217–219 |
| Salicylaldehyde | 6-(o-Hydroxybenzylamino) | 190–200 |
| m-Hydroxybenzaldehyde | 6-(m-Hydroxybenzylamino) | 135–140 |

(b) As an alternative to the procedure of paragraph (a), a solution of 2,4-diamino-6-benzylideneaminoquinazoline is prepared in the same way except that ethanol is used in place of 2-ethoxyethanol and the solution is refluxed for 2 hours instead of one hour. The solution is then hydrogenated at 45° C. in one atmosphere of hydrogen gas using 10% palladised charcoal catalyst. Water (40 parts by volume) is added and the mixture is filtered while boiling, whereupon the 2,4-diamino-6-benzylaminoquinazoline product separates on cooling; M.P. 217–219° C. The same procedure starting with an equivalent amount of p-tolualdehyde in place of benzaldehyde provides 2,4-diamino-6-(p-methylbenzylamino)quinazoline; M.P. 200–201° C.

(c) As a further alternative, a solution of 2,4-diamino-6-benzylideneaminoquinazoline prepared as in paragraph (b) is treated with a solution of sodium borohydride (2.28 g.) in ice-cold methanol (30 ml.). After one-half hour, the mixture is heated to boiling and allowed to cool. The 2,4-diamino-6-benzylaminoquinazoline sepaartes and is collected and recrystallized from aqueous ethanol; M.P. 217° C. The hydrochloride salt is prepared by crystallizing the free base from water containing one equivalent of hydrochloric acid; M.P. 298–300° C. Crystallization of the base from water containing 2.2 equivalents of formic acid provides the monoformate salt as a monohydrate; M.P. 208–210° C. The salt with pamoic acid [4,4'-methylenebis(3-hydroxy-2-naphthoic acid)] is prepared by dissolving the free base (4.45 g.) and the acid (3.27 g.) in hot 96% ethanol (0.5 liter) and collecting Example 13

2,4-diamino - 6 - (2,4,6 - trimethylbenzylideneamino)-quinazoline (11.8 g.) in ethanol (200 ml.) is hydrogenated for about two hours under 60 atmospheres of hydrogen at a temperature of 110° C. using Raney nickel catalyst. The mixture is cooled, filtered, the solvent removed by evaporation, and water (100 ml.) added to the residue. The solid product, 2,4 - diamino - 6 - (2,4,6-trimethylbenzylamino)-quinazoline is collected and recrystallized from ethanol; M.P. 248–249° C.

In the same way, other substituted benzylamino compounds can be prepared starting with the corresponding substituted benzylideneamino compounds which in turn can be prepared from the corresponding substituted benzaldehydes by condensation with 2,4,6-triaminoquinazoline as in Example 5. The following tabulation illustrates such other substituted benzylamino compounds, identified with reference to the Ar group of Formula I above:

| Ar | M.P., ° C. |
|---|---|
| o-Methylphenyl | 217 |
| m-Methylphenyl | 193 |
| p-Hydroxyphenyl | 198–200 |
| m-Chlorophenyl | 176–178 |
| p-Chlorophenyl | 205–207 |
| p-Bromophenyl | 197–203 |
| p-Fluorophenyl | 210–214 |
| 2,4-dichlorophenyl | 243–247 |
| 2,4-dichlorophenyl(monoacetate dihydrate | 230–233 |
| 3,4-dichlorophenyl | 240–243 |
| m-Methoxyphenyl | 186–189 |
| p-Methoxyphenyl | 215–216 |
| 3,4,5-trimethoxyphenyl | 201–203 |
| p-Ethoxyphenyl | 242–244 |
| p-Dimethylaminophenyl | 223–225 |
| 4-acetaminophenyl | 256 |

Example 14

α-[(2,4-diamino-6-quinazolinyl)imino] - p - toluic acid, ethyl ester (13.2 g.) in ethanol (300 ml.) is hydrogenated under 50 atmospheres of hydrogen gas at 110° C. for 5 hours using Raney nickel catalyst. After cooling, the reaction mixture is diluted with ethanol to 600 ml., and the diluate is heated and filtered while hot. The product, α-[(2,4-diamino-6-quinazolinyl)amino] - p - toluic acid, ethyl ester, which separates on cooling is collected in crystalline form; M.P. 229–230° C. The corresponding free acid is obtained by alkaline hydrolysis of the ester product; the acid has no characteristic melting point.

Example 15

2,4 - diamino - 6-[(2 - naphthylmethylene)amino] quinazoline (15.2 g.) in ethanol (700 ml.) is hydrogenated at 110° C. and 60 atmospheres of hydrogen pressure for 3 hours using Raney nickel catalyst. The reaction mixture is filtered while hot and the solid product isolated by addition of water (200 ml.) and cooling. The product is 2,4-diamino-6-[(2-naphthylmethyl)-amino]quinazoline; M.P. 242° C. In the same manner, starting with equivalent amounts of the corresponding 2-furfurylidene and 2- and 4-pyridylmethylene compounds instead of the above 2-naphthylmethylene compound, one obtains the corresponding 6-[(2-furfuryl)-, 2-pyridylmethyl)-, and (4-pyridylmethyl)-amino]-2,4-diaminoquinazolines melting respectively at 215–216, 256, and 284–288° C. after recrystallization from 50% ethanol. By the same procedure in which the 2-naphthylmethylene starting material is replaced by an equivalent amount of the corresponding 1-naphthylmethylene starting material or the 2-methyl-, 2,3-dimethyl-, 2,6-dimethyl-, and 4,7-dimethyl-1-naphthylene derivatives thereof (obtained by the procedure of Example 4 using 2,4,6-triaminoquinazoline and the corresponding 1-naphthylaldehyde), one obtains the following:

2,4-diamino-6-[(1-naphthylmethyl)
 amino]quinazoline
2,4-diamino-6-[(2-methyl-1-naphthylmethyl)
 amino]-quinazoline
2,4-diamino-6-[(2,3-dimethyl-1-naphthylmethyl)-
 amino]quinazoline
2,4-diamino-6-[(2,6-dimethyl-1-naphthylmethyl)-
 amino]quinazoline
2,4-diamino-6-[(4,7-dimethyl-1-naphthylmethyl)-
 amino]quinazoline Also by the same procedure, where the 2-naphthylmethylene starting material is replaced by an equivalent amount of a corresponding halo-, hydroxy-, or alkoxy-substituted naphthylmethylene starting material (obtained by condensation of the appropriate aldehyde listed below with 2,4,6-triaminoquinazoline according to the procedure of Example 16(a) hereinafter), the following products are produced:

| Aldehyde, Ar—CHO | 2,4-diamino-6-[(substituted naphthylmethyl)amino]quinazoline |
|---|---|
| 2-chloro-1-naphthaldehyde | 2-chloro-1-naphthylmethyl. |
| 1-bromo-2-naphthaldehyde | 1-bromo-2-naphthylmethyl. |
| 3-chloro-2-naphthaldehyde | 3-chloro-2-naphthylmethyl. |
| 4-bromo-1-naphthaldehyde | 4-bromo-1-naphthylmethyl. |
| 5-bromo-1-naphthaldehyde | 5-bromo-1-naphthylmethyl. |
| 5-bromo-2-naphthaldehyde | 5-bromo-2-naphthylmethyl. |
| 2-hydroxy-1-naphthaldehyde | 2-hydroxy-1-naphthylmethyl. |
| 4-hydroxy-1-naphthaldehyde | 4-hydroxy-1-naphthylmethyl. |
| 1-hydroxy-2-naphthaldehyde | 1-hydroxy-2-naphthylmethyl. |
| 3-hydroxy-2-naphthaldehyde | 3-hydroxy-2-naphthylmethyl. |
| 4-hydroxy-2-naphthaldehyde | 4-hydroxy-2-naphthylmethyl. |
| 2-methoxy-1-naphthaldehyde | 2-methoxy-1-naphthylmethyl. |
| 2-ethoxy-1-naphthaldehyde | 2-ethoxy-1-naphthylmethyl. |
| 3-methoxy-1-naphthaldehyde | 3-methoxy-1-naphthylmethyl. |
| 4-methoxy-1-naphthaldehyde | 4-methoxy-1-naphthylmethyl. |
| 4-ethoxy-1-naphthaldehyde | 4-ethoxy-1-naphthylmethyl. |

Example 16

(a) 2,4,6-triaminoquinazoline (17.5 g.) and 1-nitro-2-naphthaldehyde (20.1 g.) in acetic acid (750 ml.) for 3 hours. The reaction mixture is cooled and the product, 2,4 - diamino - 6-[(1-nitro-2-naphthylmethylene)amino] quinazoline, which separates in solid form, is collected by filtration. By replacing the naphthaldehyde starting material with an equivalent amount of p-nitrobenzaldehyde, one obtains by this procedure 2,4-diamino-6-(p-nitrobenzylideneamino)quinazoline.

(b) The naphthylmethylene product of (a) is dissolved in dimethylformamide (300 ml.) and the solution treated with a cold solution of sodium borohydride (11.4 g.) in methanol (150 ml.). After one-half hour, the mixture is heated to 80° C. and is allowed to cool. The solid product which separates, 2,4-diamino-6-[(1-nitro-2-naphthylmethyl)amino]-quinazoline, is collected by filtration and is dried. The corresponding 4-, 5- and 8-amino-1-naphthylmethyl isomers are prepared by a procedure which is the same in all respects to the instant example except that the starting material 1-nitro-2-naphthaldehyde is replaced with an equivalent amount of the corresponding 4-, 5- or 8-nitro-1-naphthaldehyde, respectively; similarly replacement with an equivalent of p-nitrobenzaldehyde provides the product 2,4-diamino-6-(p-nitrobenzylamino) quinazoline.

(c) 2,4 - diamino - 6-[(1-nitro-2-naphthylmethylene)-amino]quinazoline (30 g.), prepared as in (a) above, is dissolved in dimethylformamide (300 ml.) and the solution hydrogenated for six hours at 110° C. under 60 atmospheres of hydrogen pressure using Raney nickel catalyst. The mixture is filtered while hot, and the filtrate is concentrated and then diluted with an equal volume of water. The product which separates, 2,4-diamino-6-[(1-amino-2-naphthylmethyl)amino]-quinazoline, is collected and dried. The corresponding 4-, 5- and 8-amino-1-naphthylmethyl isomers can be prepared by this same procedure using as a starting material the corresponding 4-, 5- and 8-nitro-1-naphthylmethylene isomers obtainable by the procedure of paragraph (a) starting from 4-, 5- and 8-nitro-1-naphthaldehyde, respectively; likewise, where the starting material is p-nitrobenzaldehyde the product obtained by proceeding in accordance with (a) and (c) is 2,4-diamino-6-(p-aminobenzylamine)quinazoline.

Example 17

(a) A mixture of 3.9 g. of the starting material, 2,4-diamino-6-[(3,4 - dichlorobenzyl)amino]quinazoline, 1.5 g. of methyl iodide, 1.5 g. of potassium carbonate and 50 ml. of acetone is stirred and heated at reflux for 6 hours. The mixture is cooled, filtered and the filtrate evaporated at reduced pressure to give the free base product, 2,4-diamino-6-[(3,4-dichlorobenzyl)methylamino]quinazoline. To prepare a salt such as the hydrochloride, the free base is dissolved in ethanol and the solution treated with one equivalent of hydrochloric acid. On dilution with water and cooling, the monohydrochloride salt hemihydrate separates as a crystalline solid; M.P. 289–290° C.

By the same procedure, other benzylmethylamino compounds are prepared using proportionate amounts of the appropriate benzylaminoquinazoline and alkyl halide, as follows:

2,4-diamino-6-(benzylmethylamino)quinazoline mono-
 hydrochloride monohydrate; M.P. 290–292° C.
2,4-diamino-6-[(α-methylbenzyl)methylamino]-
 quinazoline
2,4-diamino-6-[(3,4-dichloro-α-methylbenzyl)-methyl-
 amino]quinazoline.

(b) The starting material for (a) above is prepared by condensing equivalent quantities of 3,4-dichlorobenzaldehyde and 2,4,6-triaminoquinazoline in 2-ethoxyethanol and then hydrogenating the reaction mixture with an equal solvent volume of ethanol at hydrogen pressure of 50 atmospheres using Raney nickel catalyst for 2 hours at 100–110° C. The product is collected from the reaction mixture after addition of water and is recrystallized from ethanol; M.P. 240–243° C.

Example 18

A solution of 18.6 g. of the starting material 2,4,6-triamino-5-chloroquinazoline and 17.5 g. of 3,4-dichlorobenzaldehyde in 200 ml. of ethanol is heated at reflux for 2 hours. The solution is cooled and there is added, with stirring, a solution of 9.9 g. of sodium borohydride in 150 ml. of methanol at 0–5° C. After one-half hour, the mixture is heated to boiling, then allowed to cool. The precipitated product, 2,4-diamino - 5 - chloro-6-[(3,4-dichlorobenzyl)amino]quinazoline, is collected and recrystallized from aqueous ethanol; M.P. 218–220° C.

By the same procedure, other related compounds are prepared starting with equivalent amounts of the appropriate carbonyl compound and the starting material, as follows:

| Carbonyl compound | 2,4-diamino-5-chloroquinazoline compound |
|---|---|
| Benzaldehyde | 6-benzylamino; M.P. 187–189° C. |
| Acetophenone | 6-[(α-methylbenzyl)amino]. |
| p-Nitrobenzaldehyde | 6-[(p-nitrobenzyl)amino]. |
| 3,4-dichloroacetophenone | 6-[(3,4-dichloro-α-methylbenzyl)amino]. |
| 2-thiophenealdehyde | 6-[(2-thienylmethyl)amino]. |
| 1-chloro-2-naphthaldehyde | 6-[(2-thienylmethyl)amino]. |
| 1-nitro-2-naphthaldehyde | 6-[(1-nitro-2-naphthylmethyl)amino]. |

Example 19

(a) 2,4-diamino-6-[(2-naphthylmethyl)amino]quinazoline (31.5 g., 0.1 mole) and 4,4'-methylenebis(3-hydroxy-2-naphthoic acid) (19.4 g., 0.05 mole) are dissolved together in hot 96% ethanol with stirring. The solution is stirred and heated on a steam bath for about 10 minutes and is then cooled and allowed to stand, if necessary, until formation of a precipitate. The desired solid product, 2,4-diamino-6-[(2-naphthylmethyl)amino]quinazoline salt with one half formula weight of 4,4'-methylenebis(3-hydroxy-2-naphthoic acid), is collected by filtration and dried.

(b) In place of 4,4'-methylenebis(3-hydroxy-2-naphthoic acid) in the foregoing procedure (a), one can use an equivalent amount of a different acid or salt, forming substance, as follows, to form the corresponding salts of 2,4-diamino-6-[(2-naphthylmethyl)amino]quinazoline:

(i) 4,4'-benzylidenebis(3-hydroxy-2-naphthoic acid)
(ii) 2,2'-dihydroxy(1,1'-binaphthalene)-3,3'-dicarboxylic acid
(iii) 3,1'-dihydroxy-4,4'-methylenedi-2-naphthoic acid
(iv) 3,6'-dihydroxy-4,5'-methylenedi-2-naphthoic acid
(v) 4,4'-methylenebis[7-bromo-3-hydroxy-2-naphthoic acid]
(vi) Fluorescein.

The naphthoic acids of (iii), (iv), and (v) can be prepared in separate procedures as follows:

(iii) A slurry of 4-(chloromethyl)-3-hydroxy-2-naphthoic acid, methyl ester (20 g.) in 500 ml. of hot glacial acetic acid is added to a hot solution of 15 g. of 1-hydroxy-2-naphthoic acid in 250 ml. of glacial acetic acid. The mixture is stirred and heated on a steam bath for 3 to 4 hours. Upon cooling, the intermediate product, 3,1'-dihydroxy-4,4'-methylenedi-2-naphthoic acid-2-methyl ester, is collected as a solid by filtration and is washed with glacial acetic acid and dried under vacuum at 75° C.; M.P. 253–256° C. (dec.). The product is dissolved in a half-liter of 1 N sodium hydroxide solution and the resulting solution is heated on a steam bath for two hours. The hydrolysis mixture is filtered, the filtrate poured into an excess of dilute hydrochloric acid, and the desired acid product (3,1'-dihydroxy-4,4'-methylenedi-2-naphthoic acid) is collected as a solid by filtration. The product, after washing with water, drying and crystallization from dimethylformamide-water, melts at 255–256° C. (dec.).

(iv) Similarly, the corresponding acid isomer, 3,6'-dihydroxy-4,5'-methylenedi-2-naphthoic acid (M.P. 296–300° C.), is obtained starting, however, from 6-hydroxy-2-naphthoic acid instead of 1-hydroxy-2-naphthoic acid.

(v) A mixture of 7-bromo-3-hydroxy-2-naphthoic acid (26.7 g.), sodium hydroxide (6 g.) and water (700 ml.) is heated to 90° C. on a steam bath, and 40% formaldehyde solution (6 ml., 0.075 mole) is added. The resulting solution is stirred and heated for 2 hours, and the solid product which separates on cooling is collected, dissolved in hot water, filtered and the filtrate acidified. The desired acid product which separates, 4,4'-methylenebis[7-bromo-3-hydroxy-2-naphthoic acid], is collected and dried under vacuum; M.P. 330–335° C. (dec.).

In place of 2,4-diamino-6-[(2-naphthylmethyl)amino]quinazoline in the foregoing procedure (a), one can use an equivalent amount of any one of the following quinazolines to form the corresponding quinazoline salt:

2,4-diamino-6-(2,4,6-trimethylbenzylamino)quinazoline
2,4-diamino-6-(3,4-dichlorobenzylamino)quinazoline
2,4-diamino-6-(p-ethoxybenzylamino)quinazoline
2,4-diamino-6-(p-chlorobenzylamino)quinazoline
2,4-diamino-6-(o-methylbenzylamino)quinazoline
2,4-diamino-6-(p-methylbenzylamino)quinazoline
2,4-diamino-6-benzylaminoquinazoline.

Also by the same procedure, any of the last-mentioned quinazolines can be reacted with any of the salt-forming substances (i) to (vi) to obtain useful salts. For the purposes of the invention, the quinazoline free bases named in this example and salts thereof are preferred for their significant pharmacological action of the type hereinabove described.

I claim:
1. A member selected from the group consisting of a free base 2,4,6-triaminoquinazoline of formula:
2. A compound according to claim 1 which in free base form is 2,4,6-triaminoquinazoline.
3. A compound according to claim 1 which in free base form is 2,4,6-triamino-5-chloroquinazoline.
4. A compound according to claim 1 which in free base form is 2,4,6-triamino-5-methylquinazoline.

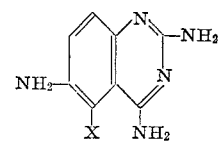

and acid addition salts thereof, where X is a member selected from the group consisting of hydrogen, chloro and methyl.

References Cited

UNITED STATES PATENTS

| 1,817,982 | 8/1931 | Hentrich et al. | 260—256.4 |
| 2,458,214 | 1/1949 | Souders | 260—580 |
| 2,541,717 | 2/1951 | Petering | 260—240 |
| 2,888,458 | 5/1959 | Stromberg | 260—240 |

FOREIGN PATENTS

| 935,381 | 1/1963 | Great Britain. |
| 750,175 | 6/1956 | Great Britain. |

OTHER REFERENCES

Billman et al.: J. Org. Chem., vol. 22, pp. 1068–1070 (1957).

Lowy et al.: An Introduction to Organic Chemistry, 6th ed., pp. 252–253, John Wiley and Sons (1945).

JOHN D. RANDOLPH, Primary Examiner

U.S. Cl. X.R.
260—240, 465, 999

UNITED STATES PATENT OFFICE
CERTIFICATE OF CORRECTION

Patent No. 3,485,842　　　　　Dated December 23, 1969

Inventor(s) John Davoll

It is certified that error appears in the above-identified patent and that said Letters Patent are hereby corrected as shown below:

Column 1, line 9, amend "September 17, 1964" to read -- September 7, 1964 --; line 23, correct the spelling of "triaminoquinazoline".

Column 4, line 31, correct the spelling of "clinical".

Column 9, line 64, correct the spelling of "separates".

Column 14, line 27, after "formula:" add:

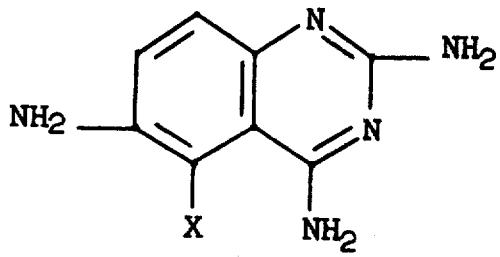

and acid addition salts thereof, where X is a member selected from the group consisting of hydrogen, chloro and methyl. --

Column 14, delete lines 34 to 43.

SIGNED AND SEALED
JUN 30 1970

(SEAL)
Attest:

Edward M. Fletcher, Jr.
Attesting Officer

WILLIAM E. SCHUYLER, JR.
Commissioner of Patents